United States Patent
Erstad et al.

(10) Patent No.: US 8,065,400 B1
(45) Date of Patent: Nov. 22, 2011

(54) METHOD FOR CONTROLLING DEVICES THAT ARE ARRANGED IN A COMMUNICATIONS NETWORK

(75) Inventors: Jakob Erstad, Wycombe (GB); Martina Frankl, Furth (DE)

(73) Assignee: Siemens Aktiengesellschaft, Munich (DE)

( * ) Notice: Subject to any disclaimer, the term of this patent is extended or adjusted under 35 U.S.C. 154(b) by 1622 days.

(21) Appl. No.: 09/959,049

(22) PCT Filed: Apr. 3, 2000

(86) PCT No.: PCT/DE00/01005
§ 371 (c)(1),
(2), (4) Date: Oct. 16, 2001

(87) PCT Pub. No.: WO00/64101
PCT Pub. Date: Oct. 26, 2000

(30) Foreign Application Priority Data

Apr. 16, 1999  (DE) .................................. 199 17 383

(51) Int. Cl.
*G06F 15/173* (2006.01)
*G06F 15/16* (2006.01)

(52) U.S. Cl. ........ 709/223; 709/217; 709/218; 709/219; 709/224; 709/225

(58) Field of Classification Search .......... 709/223–225, 709/217–219
See application file for complete search history.

(56) References Cited

U.S. PATENT DOCUMENTS

| | | | | |
|---|---|---|---|---|
| 5,996,010 A * | 11/1999 | Leong et al. | ................... | 709/223 |
| 6,138,150 A * | 10/2000 | Nichols et al. | ................ | 709/219 |
| 6,389,464 B1 * | 5/2002 | Krishnamurthy et al. | .... | 709/220 |
| 6,449,615 B1 * | 9/2002 | Liu et al. | .......................... | 707/10 |
| 6,484,196 B1 * | 11/2002 | Maurille | ....................... | 709/206 |
| 6,564,216 B2 * | 5/2003 | Waters | ............................ | 707/10 |
| 6,584,503 B1 * | 6/2003 | Carney et al. | ................. | 709/224 |
| 6,664,978 B1 * | 12/2003 | Kekic et al. | ................... | 715/733 |

FOREIGN PATENT DOCUMENTS

DE  44 18 208 A1  11/1995
EP  0 843 268 A2   5/1998

OTHER PUBLICATIONS

MONACO—Modular Open Network Agent for Control Operatins, Landru et al, pp. 600-609.
JAVA: network-centric enterprise computing, Ashok et al., pp. 1467-1480.
XP-000782974 Java-based Intelligent Mobile Agents for Open System Management, Covaci et al., pp. 492-501.
ISDN im Buro HICOM.

* cited by examiner

*Primary Examiner* — Alina N. Boutah
(74) *Attorney, Agent, or Firm* — King & Spalding L.L.P.

(57) ABSTRACT

In order centrally to control devices arranged in a computer network, via a computer network-external data processing device, a central data processing device in which control sequences, each composed of a sequence of instructions, are stored in a memory is set up in the computer network. After one of the stored control sequences has been selected, the selection having been made by a control application which runs on the computer network-external data processing device and which has been downloaded by the central data processing device, the instructions of the selected control sequence are successively transferred by the central data processing device via the computer network to the respective devices to be controlled. A control unit implemented in the devices subsequently controls an application running on the respective devices.

11 Claims, 4 Drawing Sheets

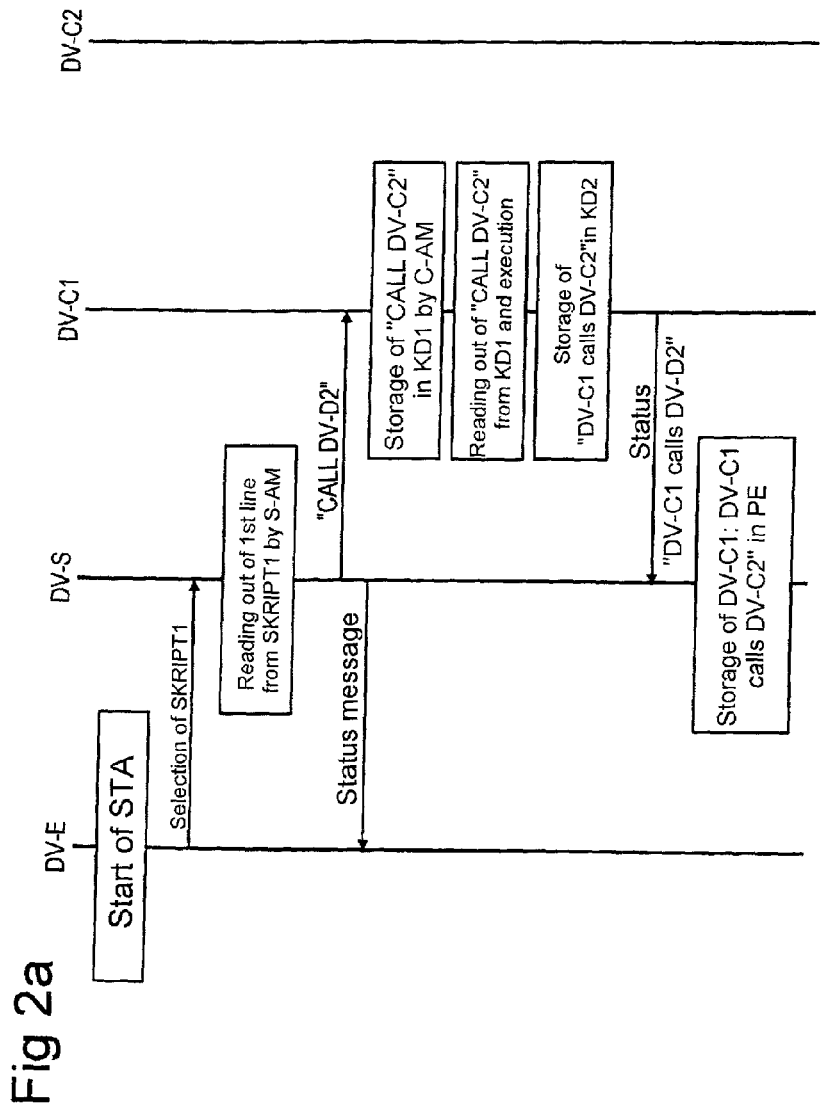

METHOD FOR CONTROLLING DEVICES THAT ARE ARRANGED IN A COMMUNICATIONS NETWORK

BACKGROUND OF THE INVENTION

The product document "Sonderausgabe telcom report and Siemens Magazin Com: ISDN im Büro—HICOM [Special issue telecommunications report and Siemens Magazine Corn: ISDN in the office—HICOM]", Siemens AG, Berlin and Munich, 1985, in particular pages 32 to 37, discloses a communications system with a private HICOM communications device in which it is possible to remotely administer or maintain the HICOM communications device from a control center which is external to the communications system, via what is referred to as an operations and data server connected to the communications device. Via the remote administration or remote maintenance it is possible, for example, to implement new applications for the communications device in the communications device without the use of personnel in situ so that, on the one hand, a shorter reaction time to requests for modifications from customers is obtained and, on the other hand, an increased level of availability of the communications device is achieved.

In modern communications systems, a communications device has multiple connections to a local computer network, referred to frequently in the literature as a LAN (Local Area Network), via which the communications device is connected to a multiplicity of data processing devices; for example, personal computers or what are referred to as workstations. Control and maintenance of the devices connected to such a local computer network is generally performed manually in situ on the respective devices.

Alternatively, Landru J. et al.: "Modular Open Network Agent for Control Operations" IEEE Network Operations and Management Symposium, US, New York, N.Y., IEEE Vol. Conf. 10, Feb. 15, 1998, XP000799531, ISBN: 0-7803-4352-2, discloses, in particular on pages 600 to 609, a universal network management subscriber interface by which access to a "Network Management Station (NMS)" connected to a local network can be carried out from an external data processing device. Here, an "HTTP request" is transferred from the external data processing device ("remote administrator with a web browser") to a "web server" arranged in the local network. The "web server" transfers a corresponding "CGI request" to the "Network Management Station (NMS)" which, in turn, transfers a corresponding "NMP request" to the device ("managed equipment") to be controlled. In response to the "NMP request", the device to be controlled transmits an "NMP response" to the "Network Management Station (NMS)" which, in turn, transfers a corresponding "CGI response" to the "web server". Finally, the "web server" transmits an "HTTP response" to the external data processing device at which the contents of the "HTTP response" can be displayed in the form of an HTML page. However, owing to the multiplicity of messages to be transferred and the multiplicity of devices involved in the method, the method described entails extremely high expenditure.

The present invention is, therefore, directed toward a method which makes it possible to control the devices connected to a local computer network from a central device with relatively low expenditure.

SUMMARY OF THE INVENTION

A significant advantage of the method according to the present invention is that, as a result of the control application which supervises the control of the devices being loaded from a central data processing device connected to the computer network to a computer network-external or computer network-internal data processing device, the devices connected to the computer network can be controlled centrally from any data processing device. As a result, an administration or maintenance function for the devices to be controlled can be carried out from any location.

One advantage of the present invention, pursuant to one embodiment, is that, inter alia, as a result of information to be transferred between the central data processing device and the devices being buffered in each case in a communications file which is set up in the devices, differently configured control units which are implemented in the respective devices can easily be actuated. The control units here must merely fulfill the requirement that they can read and evaluate information from a file and/or write information into a file.

A further advantage of refinements of the present invention which are defined in the subclaims is that, as a result of the central data processing device being configured as what is referred to as an "HTTP (HyperText Transport Protocol) server" and as a result of the use of what is referred to as a "browser" as a display unit for the data processing device, independence from the type of data processing device used and/or from the operating system installed on the data processing device is achieved. In the literature, this is often referred to as platform independence in this context.

Additional features and advantages of the present invention are described in, and will be apparent from, the following Detailed Description of the Invention and the Figures.

BRIEF DESCRIPTION OF THE FIGURES

FIGS. 2a, 2b, 2c are each parts of a flowchart showing the essential method steps running during the method according to the present invention.

DETAILED DESCRIPTION OF THE INVENTION

Figure 1:
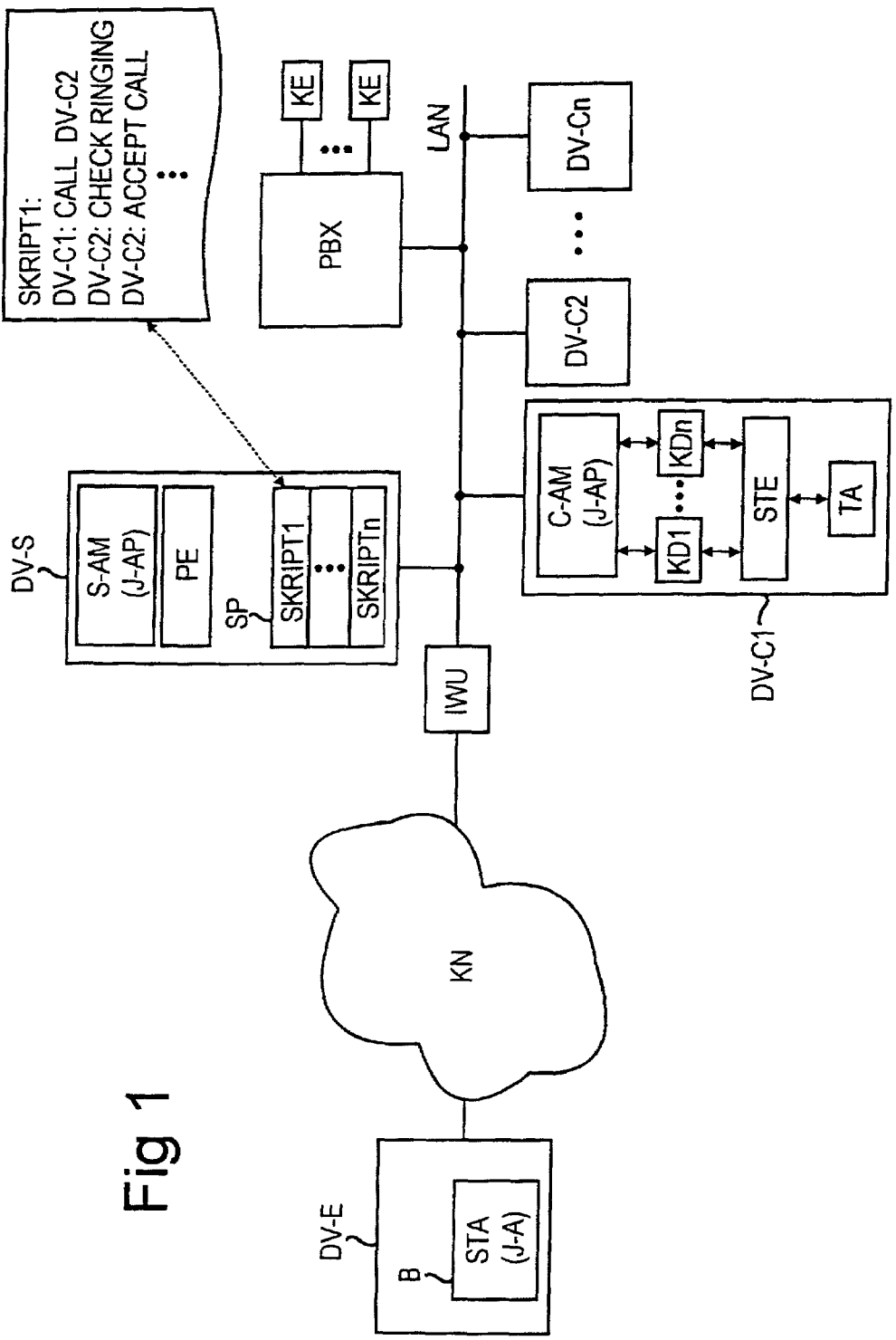
FIG. 1 is a structural diagram which schematically represents the essential functional units involved in the method according to the present invention.

FIG. 1 is a schematic representation of a local computer network LAN to which a number of data processing devices DV (for example, personal computers or what are referred to as "workstations") and a communications device PBX are connected. Communications terminal KE are connected to the local computer network LAN via the communications device PBX. The local computer network LAN is connected via an interworking unit IWU to a communications network KN; for example, to an ISDN-oriented communications network or to the Internet. The interworking unit IWU implements, in terms of its essential function, the layer 3 (network layer) of the OSI (Open Systems Interconnection) reference model, it being possible to use the interworking unit IWU to connect networks with respectively different topology of the layers 1 (physical layer) and 2 (link layer) of the OSI reference model (for example, an Ethernet LAN and an ISDN-oriented communications network) to one another physically. In order to be able to switch data packets between the different networks which are connected to the interworking unit IWU, the address information, essentially a destination address and an origin address, contained in routing information of the data packets is interpreted and evaluated by a control device located in the interworking unit IWU. The data packets are then converted into a protocol-compatible form for transfer and passed on.

Alternatively, the local computer network LAN also can be connected to the communications network KN via a module which is implemented in the communications device PBX and carries out the functions of the interworking unit. This module is connected here to the local computer network LAN via a LAN connecting unit and to the communications network KN via a network connecting unit (not illustrated).

A computer network-external data processing device Dy-E is connected to the communications network KN. The computer network-external data processing device DV-E has a display unit B, frequently referred to in the literature as a "browser", for displaying information based on the known HTTP (HyperText Transport Protocol). The data processing devices DV connected to the local computer network LAN and the communications device PBX are to be controlled centrally from the computer network-external data processing device DV-E. Alternatively, the devices DV-C, PBX connected to the local computer network LAN can be controlled from a computer network-internal data processing device.

What is referred to as a "client server architecture" is set up in the local computer network LAN for controlling the data processing devices DV connected to the local computer network LAN and the communications device PBX via the computer network-external data processing device DV-E. Here, one of the data processing devices is embodied as a controlling, central data processing device DV-S, frequently referred to in the literature as a "server", and the data processing devices to be controlled are embodied as decentralized data processing devices DV-C1, . . . , DV-Cn, frequently referred to in the literature as "clients".

A central applications module S-AM implemented in software is set up in the central data processing device DV-S. The central applications module S-AM is implemented in the present exemplary embodiment in the known programming language JAVA frequently referred to in the literature as Java application (indicated in FIG. 1 by a J-AP in brackets), as a result of which independence from the type of central data processing device DV-S used and/or from the operating system installed on the central data processing device DV-S is achieved.

In order to control the decentralized data processing devices DV-C1, . . . , DV-Cn and/or the communications device PBX via the computer network-external data processing device DV-E, a control application STA, frequently referred to in the literature as Java applet (indicated in FIG. 1 by a J-A in brackets), is loaded by the central applications module S-AM and displayed on the computer network-external data processing device DV-E via the display unit P of the computer network-external data processing device DV-E. As long as the control application STA is activated on the computer network-external data processing device DV-E, the central applications module S-AM can be controlled by the computer network-external data processing devices DV-E by transferring appropriate messages.

Messages are transferred here on the basis, for example, of the known JAVA RMI (Remote Measured Invocation) protocol.

Furthermore, in a memory SP arranged in the central data processing device DV-S, a multiplicity of control sequences SKRIPT1, . . . , SKRIPTn are stored. The control sequences SKRIPT1, . . . , SKRIPTn each have a sequence of individual control instructions for controlling the decentralized data processing devices DV-C1, . . . , DV-Cn and/or the communications device PBX. By way of example, a detail of a first control sequence SKRIPT1 is illustrated which will be explained in more detail in conjunction with FIGS. 2a-2c. In addition, the central data processing device DV-S has a protocol unit PE in which status information which is transferred by the decentralized data processing devices DV-C1, . . . , DV-Cn and/or the communications device PBX to the central data processing device DV-S can be stored. The status information which is stored in the protocol unit PE is read out of the memory SP by the central applications module S-AM and transferred to the computer network-external data processing device DV-E, as a result of a request message which is transmitted by the computer network-external data processing device DV-E and received at the central data processing device DV-S. The transferred status information is displayed to a user at the computer network-external data processing device DV-E via the display unit B.

The decentralized data processing devices DV-C1, . . . , DV-Cn to be controlled each have a decentralized applications module C-AM which is assigned to the central applications module S-AM. By analogy with the central applications module S-AM, the decentralized applications modules C-AM are also implemented in the known programming language JAVA (indicated in FIG. 2 by a J-AP in brackets). Information which is transferred to a decentralized data processing device DV-C1, . . . , DV-Cn via the local computer network LAN, in the present exemplary embodiment instructions transferred by the central applications module S-AM, is read by the local computer network LAN via the decentralized applications module C-AM, and stored in a communications file KD1, . . . , KDn which is set up for that purpose in the decentralized data processing device DV-C1, . . . , DV-Cn.

Furthermore, the decentralized data processing devices DV-C1, . . . , DV-Cn each have a control unit STE. The control unit STE monitors the communications file KD1, . . . , KDn which is set up in the decentralized data processing device DV-C1, . . . , DV-Cn. If information (instructions transferred by the central applications module S-AM in the present exemplary embodiment) is stored in the communications file KD1, . . . , KDn, the information is read out by the control unit STE and implemented for controlling any application running on the decentralized data processing devices DV-C1, . . . , DV-Cn. In the present exemplary embodiment, the application is what is referred to as a telephone application TA via which all the functional features of a conventional telephone are made available to a user on a data processing device.

In addition, the control unit STE stores status information transferred by the telephone application TA in a further communications file KD1, . . . , KDn. The decentralized applications module C-AM monitors the further communications file KD1, . . . , KDn and, in cases in which status information is stored in the further communications file KD1, . . . , KDn, reads the information out of the further communications file KD1, . . . , KDn and transfers it via the local computer network LAN to the central applications module S-AM. The central applications module S-AM stores this transferred status information in the protocol unit PE together with an item of address information which identifies the transmitting decentralized data processing device DV-C1, . . . , DV-C2. The control unit STE can be implemented, for example, as a control program in the decentralized data processing devices DV-C1, . . . , DV-Cn. An example of such a control program is what is referred to as the "WinRunner" from Mercury Interactive Corporation.

FIG. 2a shows a flowchart with the essential method steps which run in the method according to the present invention. For central control of the decentralized data processing devices DV-C1, . . . , DV-Cn connected to the local computer network LAN, and/or of the communications device PBX by the computer network-external data processing device DV-E, in a first step the display unit B of the computer network-external data processing device DV-E loads the control application STA from the central applications module S-AM onto the computer network-external data processing device DV-E.

After a control sequence SKRIPT1, . . . , SKRIPTn has been selected by the control application STA, the instructions of the selected control sequence (in the present exemplary embodiment the first control sequence SKRIPT1) are successively executed by the central applications module S-AM. Here, the central applications module S-AM reads out the first line of the selected first control sequence SKRIPT1 from the memory SP and the instruction "CALL DV-C2" stored in the first line is transferred via the local computer network LAN to the first decentralized data processing device DV-C1 addressed by the first line. In addition, the central applications module S-AM transfers a status message, for example "first instruction transferred to DV-C1", on the status of the execution of the selected first control sequence SKRIPT1 by the central applications module S-AM to the computer network-external data processing device DV-E. The transferred status message is subsequently displayed on the display unit B of the computer network-external data processing device DV-E so that, in addition to the information stored in the protocol unit PE, a user is informed online of the execution status of the first control sequence SKRIPT1.

The decentralized applications module C-AM of the addressed first decentralized data processing device DV-C1 reads the transferred instruction "CALL DV-C2" from the local computer network LAN and stores it in a first communications file KD1, set up for that purpose, in the first decentralized data processing device DV-C1. The control unit STE, which monitors the first communications file KD1, of the first decentralized data processing device DV-C1 reads the stored instruction "CALL DV-C2" out from the first communications file KD1 and converts it into a corresponding control instruction for the telephone application TA. An item of status information "DV-C1 calls DV-D2" on the status of the telephone application TE running on the first decentralized data processing device DV-C1, the information having been output by the telephone application TA as a result of a successful execution of the instruction "CALL DV-C2" is stored by the control unit STE in a second communications file KD2 set up for that purpose.

Finally, the decentralized applications module C-AM which monitors the second communications file KD2 of the first decentralized data processing device DV-C1 reads out the stored status information "DV-C1 calls DV-D2" from the second communications file KD2 and transfers it via the local computer network LAN to the central data processing device DV-S, which stores the status information "DV-C1 calls DV-D2" together with an item of address information designating the first decentralized data processing device DV-C1 in the protocol unit PE. The instructions and the status information are transferred via the local computer network LAN here on the basis of the known TCP/IP protocol (Transmission Control Protocol/Internet Protocol), for example.

Figure 2B:
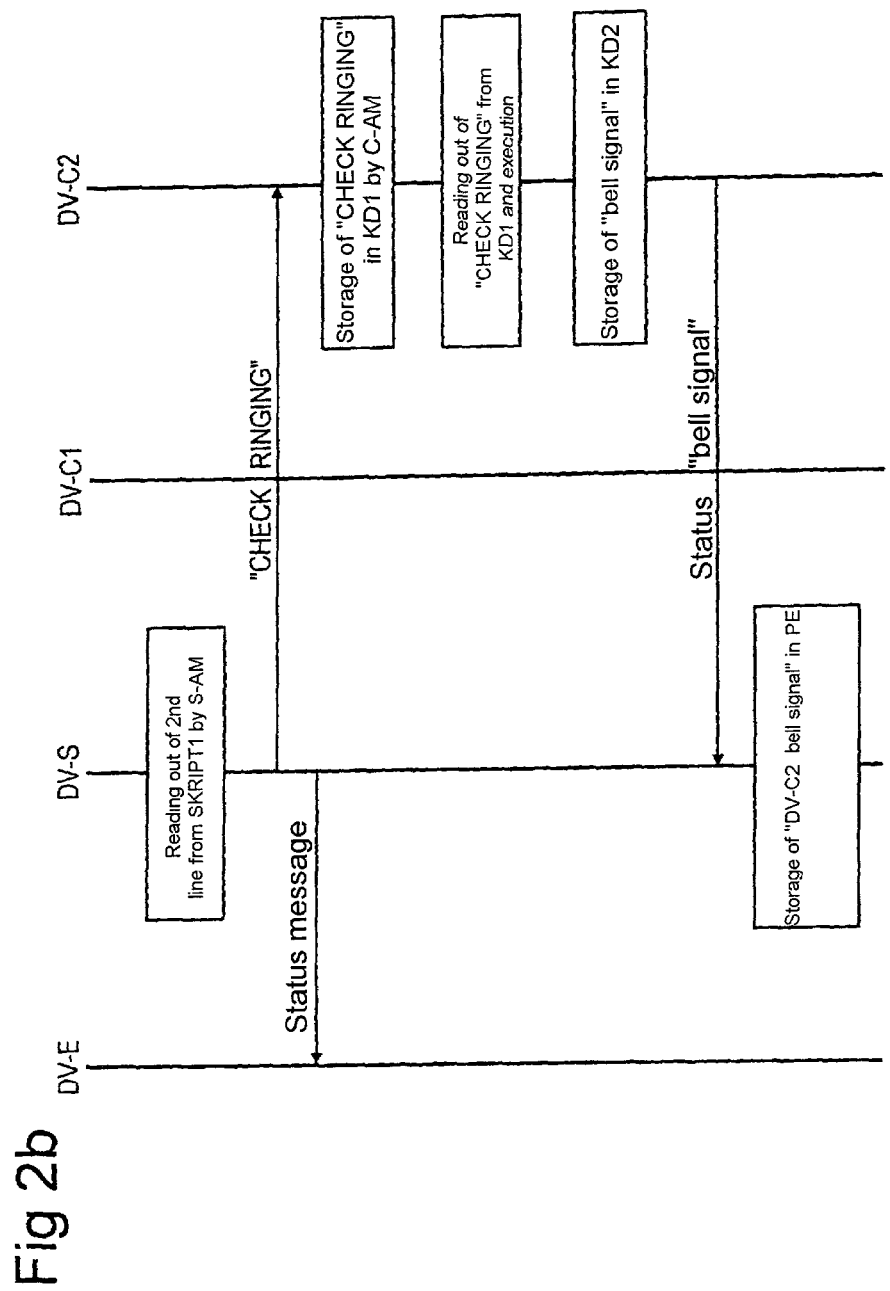

FIG. 2b shows a flowchart with the essential method steps which run during the execution of the second instruction of the selected first control sequence SKRIP1. After the successful execution of the first line of the selected first control sequence SKRIPT1, the second line of the selected first control sequence SKRIPT1 is read out of the memory SP by the central applications module S-AM and the instruction "CHECK RINGING" stored in the second line is transferred via the local computer network LAN to the second decentralized data processing device DV-C2 addressed by the second line. In addition, the central applications module S-AM, in turn, transfers a status message (for example, "second instruction transferred to DV-C2") on the status of the execution of the selected first control sequence SKRIPT1 by the central applications module S-AM to the computer network-external data processing device DV-E.

The decentralized applications module C-AM of the addressed, second decentralized data processing device DV-C2 reads the transferred instruction "CHECK RINGING" from the local computer network LAN and stores it in a first communications file KD1, set up for that purpose, of the second decentralized data processing device DV-C2. The instruction "CHECK RINGING" stored in the first communications file KD1 is subsequently read out by the control device STE of the second decentralized data processing device DV-C2 and converted into a corresponding control instruction for the telephone application TA. An item of status information "bell signal" on the status of the telephone application TA running on the second decentralized data processing device DV-C2, said information having been output by the telephone application TA as a result of a successful execution of the instruction "CHECK RINGING", is stored by the control unit STE in a second communications file KD2, set up for that purpose, of the second decentralized data processing device DV-C2.

Finally, the decentralized applications module C-AM which monitors the second communications file KD2 of the second decentralized data processing device DV-C2 reads out the stored status information "bell signal" from the second communications file KD2 and transfers it by way of the local computer network LAN to the central data processing device DV-S, which stores the status information "bell signal" together with an item of address information designating the second decentralized data processing device DV-C2 in the protocol unit PE.

Figure 2C:
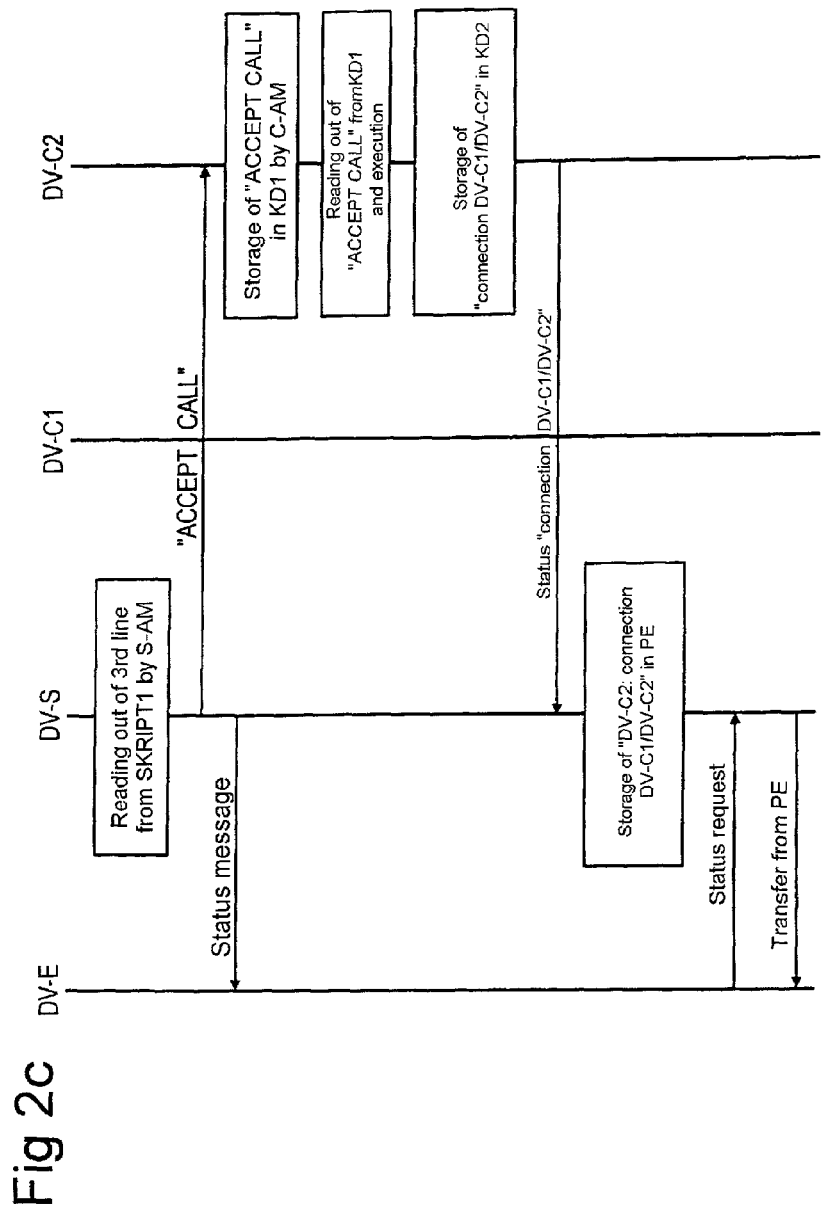

FIG. 2c shows a flowchart with the essential method steps which run during the execution of the third instruction of the selected first control sequence SKRIP1. After the successful execution of the second line of the selected first control sequence SKRIPT1, the third line of the selected first control sequence SKRIPT1 is read out from the memory SP by the central applications module S-AM and the instruction "ACCEPT CALL" stored in the third line is transferred via the local computer network LAN to the second decentralized data processing device DV-C2 which is addressed by the third line. In addition, the central applications module S-AM, in turn, transfers a status message (for example, "third instruction transferred to DV-C2") on the status of the execution of the selected first control sequence SKRIPT1 by the central applications module S-AM to the computer network-external data processing device DV-E.

The decentralized applications module C-AM of the addressed second decentralized data processing device DV-C2 reads the transferred instruction "ACCEPT CALL" from the local computer network LAN and stores it, in turn, in the first communications file KD1 of the second decentralized data processing device DV-C2. The instruction "ACCEPT CALL" stored in the first communications file KD1 is then read out by the control unit STE of the second decentralized data processing device DV-C2 and converted into a corresponding control instruction for the telephone application TA. An item of status information "connection DV-C1/DV-C2" on the status of the telephone application TA running on the second decentralized data processing device DV-C2, the information having been output by the telephone application TA as a result of a successful execution of the instruction "ACCEPT CALL" is stored by the control unit STE in the second communications file KD2.

Finally, the decentralized applications module C-AM which monitors the second communications file KD2 of the second decentralized data processing device DV-C2 reads out the stored status information "connection DV-C1/DV-C2" from the second communications file KD2 and transfers it via the local computer network LAN to the central data processing device DV-S, which stores the status information "connection DV-C1/DV-C2", together with an item of address information designating the second decentralized data processing device DV-C2, in the protocol unit PE.

The status information items "DV-C1: DV-C1 calls DV-C2", "DV-C2: bell signal" and "DV-C2: connection DV-C1/DV-C2" which are stored in the protocol unit PE are read out from the protocol unit PE by the central applications module S-AM of the central data processing device DV-S after a request message has been transferred by the computer network-external data processing device DV-E to the central data processing device DV-S, and the status information items are transferred to the computer network-external data processing device DV-E. The status information items "DV-C1: DV-C1 calls DV-C2", "DV-C2: bell signal" and "DV-C2: connection DV-C1/DV-C2" are transferred to the computer network-external data processing device DV-E here on the basis, for example, of the HTTP protocol (HyperText Transport Protocol) as what is referred to as a HTML (HyperText Markup Language) page.

In order to control the communications device PBX connected to the local computer network LAN, a further applications module (not illustrated), in addition to the central applications module S-AM, is implemented in the central data processing device DV-S, the further applications module converting the instructions stored in the control sequences SKRIPT1, . . . , SKRIPTn into communications device-specific instructions. Such communications device-specific instructions are frequently abbreviated in the literature to AMO (Administration and Maintenance Orders).

Although the present invention has been described with reference to specific embodiments, those of skill in the art will recognize that changes may be made thereto without departing from the spirit and scope of the invention as set forth in the hereafter appended claims.

The invention claimed is:

1. A method for controlling a plurality of devices in a computer network via a data processing device, the method comprising the steps of:
storing control sequences in a central applications module contained in a memory of a central data processing device operatively coupled to the computer network, each control sequence including a sequence of instructions, wherein the central data processing device includes a protocol unit, and wherein the central applications module has a plurality of decentralized application modules assigned to it;
transmitting respectively assigned decentralized application modules to data processing devices requesting download of the respective decentralized application module, wherein the data processing devices each include a control unit;
selecting one of the stored control sequences in accordance with instruction received from the downloaded decentralized application modules;
transferring successively the instructions of the selected control sequence from the central applications module via the computer network to a respective control unit of the plurality of devices in the computer network, wherein the instructions are transmitted as a communications file;
receiving a status message from at least one control unit, wherein the status message contains communication status information on an application running on the control unit, and wherein the status message is at least partially derived from the communications file; and
transmitting control data to the application, wherein the control data is at least partially derived from the received status message.

2. A method for controlling devices in a computer network as claimed in claim 1, the method further comprising the steps of: connecting the data processing device to a communications network; and connecting the communications network to the computer network via an interworking unit.

3. A method for controlling devices in a computer network as claimed in claim 2, wherein the interworking unit is a communications system having both a network connecting unit for connecting to the communications network and a LAN connecting unit for connecting to the computer network, and wherein the communications system performs a bidirectional transfer between a data format of the communications network and the computer network.

4. A method for controlling devices in a computer network as claimed in claim 1, the method further comprising the steps of:
storing, via a respective decentralized applications module, the received communications file; and
reading out, via the control unit implemented in the device, the instruction from the communications file.

5. A method for controlling devices in a computer network as claimed in claim 1, the method further comprising the step of:
transferring automatically, via the central applications module and after an instruction has been transferred to a device, a status message on an execution status of the selected control sequence to the data processing device.

6. A method for controlling devices in a computer network as claimed in claim 1, wherein data is transferred between the central applications module and the data processing device based on the HTTP protocol.

7. A method for controlling devices in a computer network as claimed in claim 6, wherein the data processing device has a display unit via which information based on the HTTP protocol is displayed on the data processing device.

8. A method for controlling devices in a computer network as claimed in claim 4, the method further comprising the steps of:
generating and storing status messages in the control unit after receiving the instructions of the selected control sequence from the central applications module, wherein the status messages indicate a current status of the applications running on the device, and wherein the status messages are stored in a further communications file;
reading out the status messages, via the decentralized applications module, contained in the further communications file;
transferring the status messages, via the decentralized applications module, via the computer network to the central applications module; and
storing the received status messages, via the central applications module, in a protocol unit arranged in the central data processing device.

9. A method for controlling devices in a computer network as claimed in claim 8, the method further comprising the step of:
storing, in addition to the status message, address information identifying the transmitting device in the protocol unit.

10. A method for controlling devices in a computer network as claimed in claim 8, the method further comprising the step of:

transferring the status messages stored in the protocol unit to the data processing device after the central applications module has received a request message transferred by the data processing device.

11. A method for controlling a plurality of devices in a computer network via a data processing device, the method comprising the steps of:

storing control sequences in a memory of a central data processing device operatively coupled to the computer network, each control sequence including a sequence of instructions;

selecting one of the stored control sequences by a control application that has been downloaded from the central data processing device and executed on the data processing device;

transferring successively the instructions of the selected control sequence from the central data processing device via the computer network to the plurality of devices in the computer network; and controlling applications running on at least one of the plurality of devices by a control unit, implemented in the at least one device, via the transferred instructions;

generating and storing status messages in the control unit after receiving the instructions of the selected control sequence from the central applications module, wherein the status messages indicate a current status of the applications running on the device, and wherein the status messages are stored in a further communications file;

reading out the status messages, via the decentralized applications module, contained in the further communications file;

transferring the status messages, via the decentralized applications module, via the computer network to the central applications module; and storing the received status messages, via the central applications module, in a protocol unit arranged in the central data processing device; and storing, in addition to the status message, address information identifying the transmitting device in the protocol unit.

* * * * *